(12) United States Patent
Xiao et al.

(10) Patent No.: US 9,235,575 B1
(45) Date of Patent: Jan. 12, 2016

(54) SYSTEMS AND METHODS USING A SLIDESHOW GENERATOR

(75) Inventors: Jun Xiao, Palo Alto, CA (US); Jiajian Chen, Atlanta, GA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 1245 days.

(21) Appl. No.: 12/719,134

(22) Filed: Mar. 8, 2010

(51) Int. Cl.
*G06F 17/30* (2006.01)

(52) U.S. Cl.
CPC ............................... *G06F 17/30056* (2013.01)

(58) Field of Classification Search
CPC ................ G06F 17/30056; G06F 17/30274; G06F 3/0485
USPC ......................................................... 715/732
See application file for complete search history.

(56) References Cited

U.S. PATENT DOCUMENTS

| | | |
|---|---|---|
| 4,373,784 A | 2/1983 | Nonomura et al. |
| 4,662,746 A | 5/1987 | Hornbeck |
| 4,811,003 A | 3/1989 | Strathman et al. |
| 4,956,619 A | 9/1990 | Hornbeck |
| 5,061,049 A | 10/1991 | Hornbeck |
| 5,083,857 A | 1/1992 | Hornbeck |
| 5,146,356 A | 9/1992 | Carlson |
| 5,309,241 A | 5/1994 | Hoagland |
| 5,317,409 A | 5/1994 | Macocs |
| 5,319,744 A | 6/1994 | Kelly et al. |
| 5,386,253 A | 1/1995 | Fielding |
| 5,402,184 A | 3/1995 | O'Grady et al. |
| 5,490,009 A | 2/1996 | Venkateswar et al. |
| 5,557,353 A | 9/1996 | Stahl |
| 5,689,283 A | 11/1997 | Shirochi |
| 5,751,379 A | 5/1998 | Markandey et al. |
| 5,842,762 A | 12/1998 | Clarke |
| 5,897,191 A | 4/1999 | Clarke |
| 5,912,773 A | 6/1999 | Barnett et al. |
| 5,920,365 A | 7/1999 | Eriksson |
| 5,953,148 A | 9/1999 | Moseley et al. |
| 5,978,518 A | 11/1999 | Oliyide et al. |
| 6,025,951 A | 2/2000 | Swart et al. |
| 6,067,143 A | 5/2000 | Tomita |
| 6,104,375 A | 8/2000 | Lam |
| 6,118,584 A | 9/2000 | Van Berkel et al. |
| 6,141,039 A | 10/2000 | Poetsch |
| 6,184,969 B1 | 2/2001 | Fergason |
| 6,219,017 B1 | 4/2001 | Shimada et al. |
| 6,239,783 B1 | 5/2001 | Hill et al. |
| 6,243,055 B1 | 6/2001 | Fergason |
| 6,313,888 B1 | 11/2001 | Tabata |
| 6,317,171 B1 | 11/2001 | Dewald |
| 6,384,816 B1 | 5/2002 | Tabata |

(Continued)

FOREIGN PATENT DOCUMENTS

EP     1 001 306 A2    5/2000

OTHER PUBLICATIONS

Chen et al. "Tiling Slideshow", Oct. 2006, pp. 25-34.*

(Continued)

*Primary Examiner* — Sherrod Keaton
(74) *Attorney, Agent, or Firm* — Dicke, Billig & Czaja, PLLC (Pat)

(57) ABSTRACT

Embodiments of generating in-slide and between slide transitions in a slideshow based on image content analysis are provided.

17 Claims, 6 Drawing Sheets

(56) References Cited

U.S. PATENT DOCUMENTS

| | | | |
|---|---|---|---|
| 6,390,050 B2 | 5/2002 | Feikus | |
| 6,393,145 B2 | 5/2002 | Betrisey et al. | |
| 6,456,339 B1 | 9/2002 | Surati et al. | |
| 6,522,356 B1 | 2/2003 | Watanabe | |
| 6,657,603 B1 | 12/2003 | Demetrescu et al. | |
| 6,695,451 B1 | 2/2004 | Yamasaki et al. | |
| 7,019,713 B2 | 3/2006 | Hereld et al. | |
| 7,038,727 B2 | 5/2006 | Majumder et al. | |
| 7,630,021 B2* | 12/2009 | Matsuzaka et al. | 348/700 |
| 2003/0020809 A1 | 1/2003 | Gibbon et al. | |
| 2003/0076325 A1 | 4/2003 | Thrasher | |
| 2003/0090597 A1 | 5/2003 | Katoh et al. | |
| 2004/0239885 A1 | 12/2004 | Jaynes et al. | |
| 2007/0058884 A1* | 3/2007 | Rother et al. | 382/284 |
| 2008/0082012 A1 | 4/2008 | Gunderson et al. | |
| 2009/0002764 A1 | 1/2009 | Atkins et al. | |
| 2009/0089660 A1 | 4/2009 | Atkins et al. | |
| 2009/0193359 A1* | 7/2009 | Anthony | G06T 3/40 715/804 |
| 2009/0262116 A1* | 10/2009 | Zhao | G06T 13/00 345/473 |
| 2010/0293470 A1* | 11/2010 | Zhao et al. | 715/732 |
| 2013/0124951 A1* | 5/2013 | Shechtman | G06T 13/80 715/201 |

OTHER PUBLICATIONS

Chen et al. "iSlideshow: a content-aware slideshow" system, Feb. 2010, pp. 293-296.*

Chen et al. (Tiling Slideshow), Oct. 2006, pp. 25-34.*

M.Brown et al., "A practical and flexible tiled display system." In Pacific Conf. on Comp. Graphics and Apps., 2002.

N. Chang, "Efficient dense correspondences using temporally-encoded light patterns." IEEE Intl. Workshop on on Projector-Camera Systems, Oct. 12, 2003, Nice, France.

A. Majumder et al. "Perceptual photometric seamlessness in projection-based tiled displays." In ACM Transactions on Graphics, vol. 24, No. 1, pp. 118-139, 2005.

A. Raij et al. "PixelFlex2: a comprehensive, automatic, causally-aligned multiprojector display". IEEE Intl. Workshop on Projector-Camera Systems, Oct. 12, 2003, Nice, FR.

R. Raskar et al. "Seamless projection overlaps using image warping and intensity blending." In Intl. Conf. on Virtual Systems and Multimedia, Gifu Japan, 1998.

R. Raskar et al. "Multiprojector displays using camera-based registration." In IEEE Visualization, p. 161-168,1999.

R. Raskar et al. "iLamps: Geometrically Aware and Self-Configuring Projectors". In ACM Transactions on Graphics, vol. 22, No. 3, pp. 809-818, 2003.

R. Surati. Scalable self-calibrating display technology for seamless large-scale displays. Ph.D. thesis, Dept. of Computer Science, MIT, 1998.

R. Szeliski. "Video Mosaics for Virtual Environments", IEEE Computer Graphics and Applications, pp. 22-30, Mar. 1996.

Tanguay, Donald et al., "Nizza: A Framework for Developing Real-time Streaming Multimedia Applications", HP Laboratories, HPL-2004-132, Aug. 2, 2004, 9 pages.

C. Jaynes et al., "Super-Resolution Composition in Multi-Projector Display's," IEEE Int'l Workshop on Projector-Camera Systems, Oct. 2003; 8 pgs.

L.M Chen & S. Hasagawa, "Visual Resolution Limits for Color Matrix Displays—One Panel Projectors", vol. 13, pp. 221-226, 1992.

A. Yasuda et al., "FLC Wobbling for High Resolution Projectors", Journal of the SID, May 1997, pp. 229-305.

T. Tokita et al., "P-108: FLC Resolution-Enhancing Device for Projection Displays", SID 02 Digest 2002, pp. 638-641.

D.K. Kelley, "Motion and Vision—II. Stabilized Spatio-Temporal Threshold Surface", Journal of the Optical Society of America, vol. 69, No. 10, Oct. 1979.

Candice H. Brown Elliott et al., "Color Subpixel Rendering Projectors and Flat Panel Displays"; SMPTE Advanced Motion Imaging Conference: Feb. 27- Mar. 1, 2003; pp. 1-4.

Diana C. Chen, "Display Resolution Enhancement with Optical Scanners", Applied Optics, vol. 40, No. 5, Feb. 10, 2001; pp. 636-643.

Brochure entitled "The Use of Dual Graphics Devices on the High-End HP xw9300 Workstation", Hewlett-Packard Development Company, #5983-0684EN, Feb. 2005, 8 pages.

Wylie, "Frustration-free photo books", Oct. 2009, accessible from http://www.hpl.hp.com/nrews/2009/oct-dec/magicphotobook.html.

Rother et al., "AutoCollage", International Conference on Computer Graphics and Interactive Technologies, ACM Siggraph 2006 Papers, Jul. 2006, Boston, MA.

Perez et al., "Poisson Image Editing", International Conference on Computer Graphics and Interactive Technologies, ACM SIGGRAPH 2003 Papers, Jul. 2003, San Diego, CA.

Chen et al., "Tiling Slideshow", International Multimedia Conference, Proceedings of the 14th annual conference on Multimedia, Oct. 2006, Santa Barbara, CA.

Xiao et al., "Mixed-Initiative Photo Collage Authoring", International Multimedia Conference, Proceedings of the 16th ACM international conference on Multimedia, Oct. 2008, Vancouver, BC, Canada.

McFarland, Dave, "Animation in a Flash", Macworld, Jun. 2000, pp. 99-101.

* cited by examiner

SYSTEMS AND METHODS USING A SLIDESHOW GENERATOR

BACKGROUND

Digital cameras allow users to easily capture and store many digital images. Unfortunately, users may have access to limited tools that allow the digital images to be organized and presented. Even with the tools available to a user, the user may find the organization and presentation of images tedious or difficult to understand. It would be desirable for a user to be able to generate an organized and meaningful presentation of digital images.

SUMMARY

A method performed by a processing system. The method includes receiving a layout of a first slide of a slideshow with the processing system. The first slide includes first and second digital images selected based on an image content analysis of a set of digital images that include the first and the second digital images. The method also includes generating an in-slide transition between the first and the second digital images of the first slide with the processing system using the layout such that the in-slide transition emphasizes a first relationship between the first and the second digital images determined from the image content analysis

DETAILED DESCRIPTION

In the following detailed description, reference is made to the accompanying drawings, which form a part hereof, and in which is shown by way of illustration specific embodiments in which the disclosed subject matter may be practiced. It is to be understood that other embodiments may be utilized and structural or logical changes may be made without departing from the scope of the present disclosure. The following detailed description, therefore, is not to be taken in a limiting sense, and the scope of the present disclosure is defined by the appended claims.

As described herein, a content aware slideshow generator is provided that generates a content aware slideshow from a set of digital images using image metadata produced by image content analysis of the images. The slideshow generator prunes, clusters, and arranges the set of images into slides based on content similarities identified from the metadata. The slideshow generator arranges the slides to include transitions that consider the relationship between individual images in the slides. The transitions include in-slide transitions that seamlessly integrate multiple images on a slide and between-slide transitions that produce meaningful animations between sequences of slides. The slideshow generator outputs a slideshow with a sequence of seamlessly tiled slides with animations between selected slides.

The content aware slideshow generator may be used to automatically generate slideshows for photo collections stored as digital images. The slideshow generator selectively and intelligently arranges a flow of photos to emphasize the identified relationships between the photos and create a slideshow that is fluid, meaningful, and dynamic. By doing so, the slideshow generator may enhance the browsing experiences of viewers of the photos and facilitate sharing of the photos by the viewer.

Figure 1:
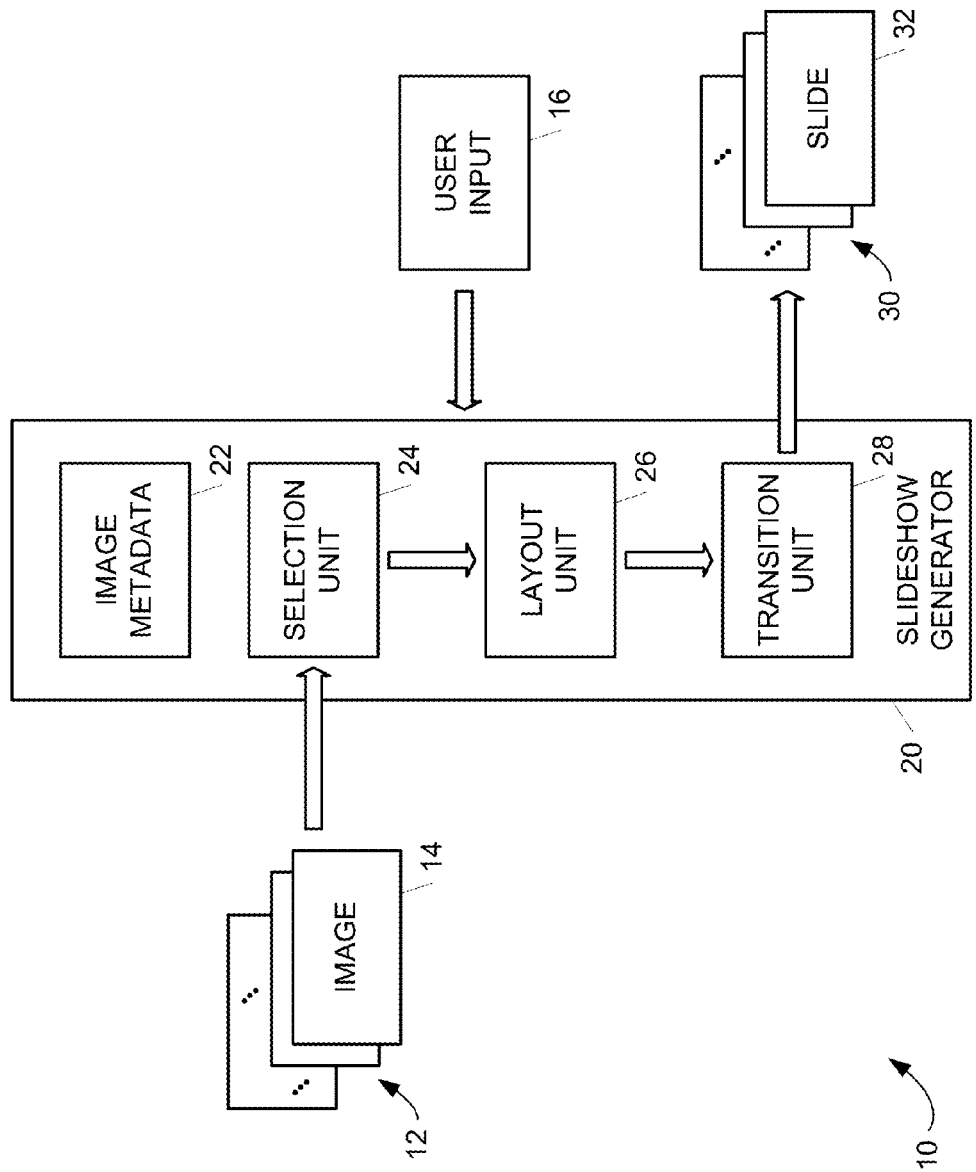
FIG. 1 is a block diagram illustrating one embodiment of an image processing environment.

FIG. 1 is a block diagram illustrating one embodiment of an image processing environment 10. Image processing environment 10 represents a runtime mode of operation in an image processing system, such as an image processing system 100 shown in FIG. 8 and described in additional detail below. Image processing environment 10 includes a set 12 of images 14, a content aware slideshow generator 20, and a slideshow 30 with slides 32. Image processing environment 10 may also include a user input 16 provided to the image processing system in any suitable way.

Set 12 of images 14 includes any number of images 14. Each image 14 includes information that represents a digital image stored in any suitable storage medium or media (e.g., memory system 104 shown in FIG. 8 and described in additional detail below). Each digital image may be captured by a digital image capture device (e.g., an image capture device 200 shown in FIG. 9 and described in additional detail below), provided from a digital media (e.g., a flash card, a flash drive, a CD, or a DVD), converted from a non-digital media (e.g., film) into a digital format, and/or created using a computer graphics or other suitable image generation program. Each image 14 may be displayed by one or more display devices (e.g., one or more of display devices 108 shown in FIG. 8 and described in additional detail below) or other suitable output devices to reproduce the digital image.

Slideshow generator 20 is configured to receive or access frames 12 from a storage medium and generate a content aware slideshow 30 with slides 32. Slideshow generator 20 generates, accesses, or otherwise receives image metadata 22 that provides allows content similarities between subsets of images 14 in the set 12 to be identified by slideshow generator 20. Slideshow generator 20 prunes, clusters, and arranges the set 12 of images 14 into slides 32 based on content similarities identified from the metadata. Slideshow generator 20 interprets the content similarities to extrapolate relationships between images 14 and allow related images to be arranged in slides 32 that result in a semantically meaningful slideshow 30. Slideshow generator 20 also generates transitions in slideshow 30 that consider the relationship between individual images 14 in slides 32. The transitions include in-slide transitions that seamlessly integrate multiple images 14 on a slide 32 and between-slide transitions that produce meaningful animations between selected slides 32. The slideshow generator outputs slideshow 30 such that slideshow 30 includes a sequence of seamlessly tiled slides 32 with animations between selected slides 32.

Slideshow generator 20 includes a selection unit 24, a layout unit 26, and a transition unit 28. The general operation of slideshow generator 20 will be described with reference to FIG. 2, which is a flow diagram illustrating one example of a method for generating content aware slideshow 30.

Figure 2:
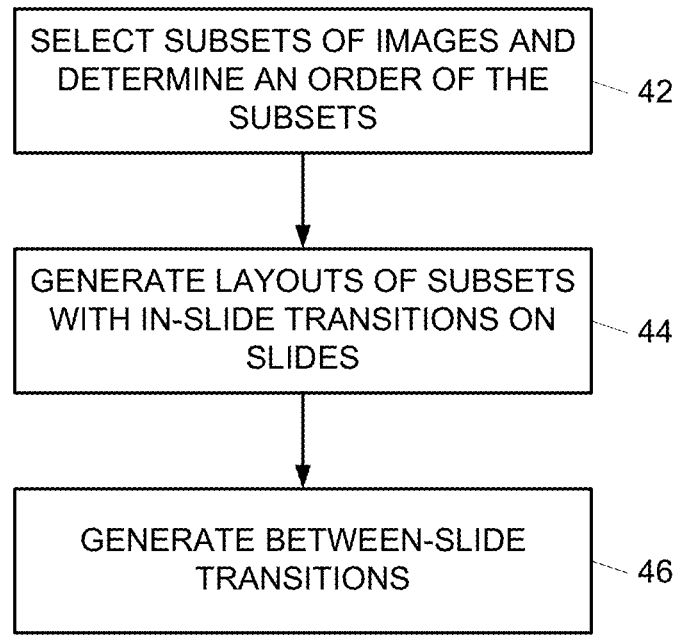
FIG. 2 is a flow diagram illustrating one embodiment of a method for generating a content aware slideshow.

As shown in FIG. 2, a selection unit 24 selects subsets of images 14 from the set 12 of images 14 and determines an ordering of the subsets as indicated in a block 42. Selection unit 24 makes proactive suggestions about which images 14 in set 12 are to be added to slideshow 30 along with the groupings and order of the selected images 14.

To select images 14, selection unit 24 applies one or more image analysis algorithms to images 14 to identify content similarities in images 14 in set 12 and stores the data generated by the algorithms as image metadata 22. Examples of content similarities include, but are not limited to, similar colors, textures, patterns, and/or objects such as faces or other distinctive features in images 14. For example, the image analysis algorithms may include a blurry filter that detects the strength and frequency of image edges and a boring filter that weighs color variation across the image and identifies content similarities based on the image edge and color variation information. The image analysis algorithms may also identify and match objects such as faces or other distinctive features of images 14. In addition, the image analysis algorithms may identify and eliminate duplicate and near duplicate images 14 based on content similarities. With each image analysis algorithm, selection unit 24 may consider time stamp information associated with images 14 because images 14 captured more closely in time may have a higher likelihood of having content similarities than images 14 captured further apart in time. Further, selection unit 24 may receive user inputs 16 regarding one or more images 14 and include images 14 in or exclude images 14 from a subset based on the user inputs 16.

Figure 3:
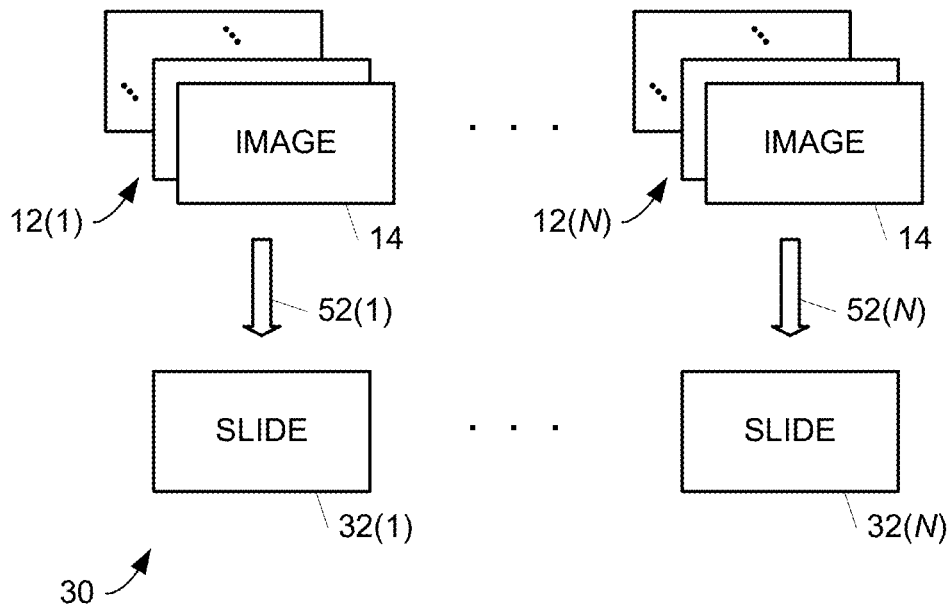
FIG. 3 is a block diagram illustrating one embodiment of selecting images for slides.

FIG. 3 is a block diagram illustrating one example of selecting images 14 for slides 32. As shown in FIG. 3, selection unit 24 groups the set 12 of images 14 into subsets 12(1)-12(N), where N is an integer that is greater than or equal to two and where the combined number of images 14 in subsets 12(1)-12(N) is less than or equal to the total number of images 14 in set 12. Selection unit 24 clusters images 14 into subsets 12(1)-12(N) based on the content similarities identified by the image analysis algorithms and/or user input 16. Selection unit 24 groups images 14 with the highest measures of content similarities in forming subsets 12(1)-12(N) to attempt to generate meaningful combinations of images 14. Selection unit 24 provides subsets 12(1)-12(N) along with relative weights for each image 14 that reflect the relative importance of each image 14 within a subset 12(1)-12(N) to layout unit 26.

Referring to FIGS. 2 and 3, layout unit 26 generates layouts of subsets 12(1)-12(N) with in-slide transitions on corresponding slides 32(1)-32(N) as indicated in a block 44 and by arrows 52(1)-52(N) in FIG. 3. Layout unit 26 dynamically computes layouts, morphs between layouts, and seamlessly stitches images 14 in each layout to form in-slide transitions between images 14. Because images 14 grouped in each subset 12(1)-12(N) have content similarities, layout unit 26 achieves seamless tiling of images 14 on each slide 32(1)-32(N) using the method described in FIG. 4 in one example.

Figure 4:
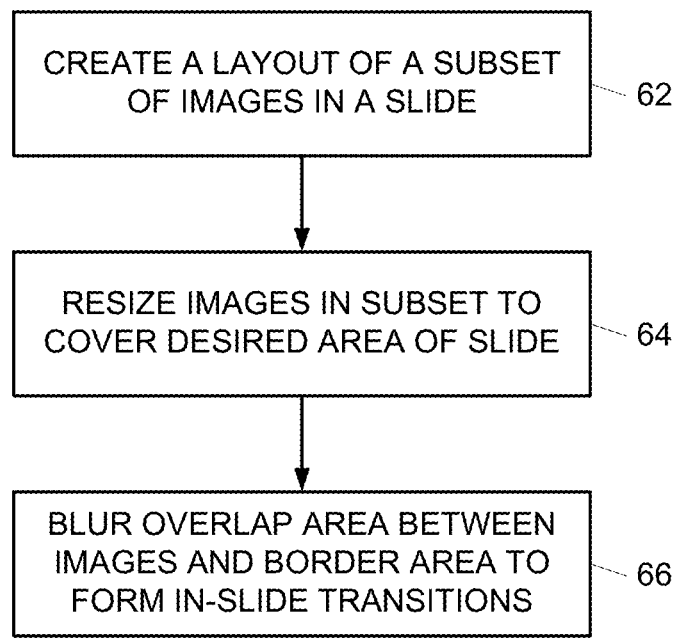
FIG. 4 is a flow diagram illustrating one embodiment of a method for generating a layout of images on a slide.
Figure 5A:
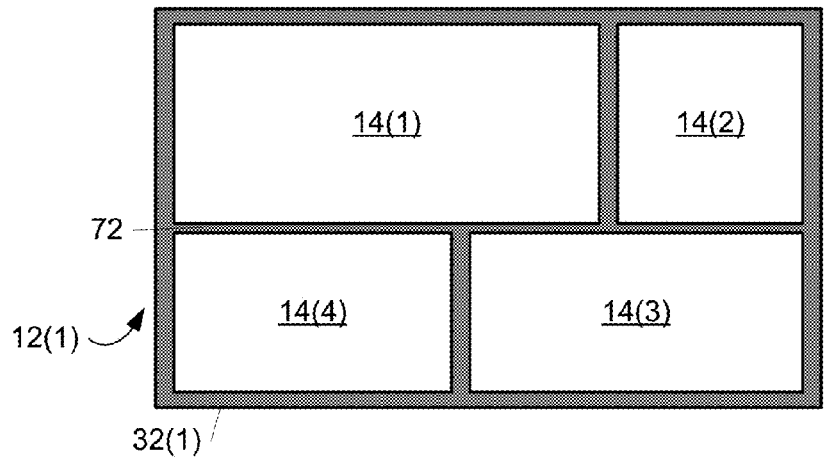
FIGS. 5A-5C are block diagrams illustrating embodiments of generating an in-slide transition.

FIG. 4 is a flow diagram illustrating one example of a method for generating a layout of images 14 on a slide 32. In FIG. 4, layout unit 26 creates a layout of a subset 12(1)-12(N) of images in a slide 32 as indicated in a block 62. For each subset 12(1)-12(N), layout unit 26 considers the relative weights of each image 14 provided by selection unit 24 and may generate a layout that places images 14 with higher weights in larger and more prominent positions on a slide than those images 14 with lower weights. As shown in the example of FIG. 5A, layout unit 26 arranges images 14(1)-14(4) of subset 12(1) on a slide 32(1). Layout unit 26 places image 14(1) that has a higher weight in a larger and more prominent position on a slide than image 14(2) that has a lower weight. Layout unit 26 may initially create a seamed layout such that a border 72 with a contrasting color (e.g., black or dark grey) to images 14(1)-14(4) may appear around and between images 14(1)-14(4).

Figure 5B:
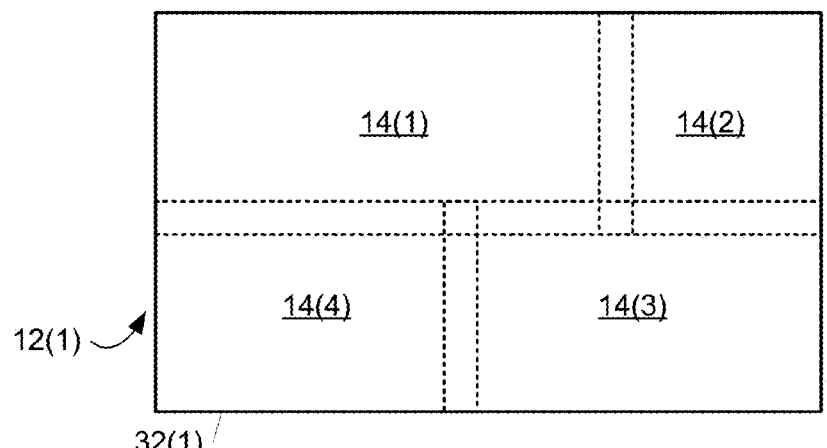

Referring back to FIG. 4, layout unit 26 resizes images 14 in the subset 12(1)-12(N) to cover a desired area of slide 32 as indicated in a block 64. For example, as shown in FIG. 5B, layout unit 26 resizes images 14(1)-14(4) such that images 14(1)-14(4) overlap one another as indicated by the dotted lines and cover slide 32(1). In resizing images 14(1)-14(4), layout unit 26 may assume that the centers of each images 14(1)-14(4) are the regions of interest or may determine other regions of interest (e.g., faces) based on image metadata 22. In the example shown in FIG. 5B, the size of each image 14(1)-14(4) is increased. However, the size of one or more of images 14(1)-14(4) may be decreased or remain the same size in other examples to suitably cover slide 32(1). By covering slide 32(1) with the resized images 14(1)-14(4), layout unit 26 removes border 72 as shown in FIG. 5B.

Referring back to FIG. 4, layout unit 26 blurs the overlap area between the images 14 and the border area of slide 32 to form in-slide transitions between images 14 as indicated in a block 66. In one example, layout unit blurs the overlap area between images 14 using a super-eclipse pattern. In an example, a super-eclipse function that forms a super-eclipse pattern can be expressed as a round-corner rectangle, for example, according to an equation such as Equation I where a represents the width of an image 14, b represents the length of an image 14, and d represents the radius of the circular edges of the image 14.

$$\left(\frac{x}{a}\right)^{\frac{2}{d}} + \left(\frac{y}{b}\right)^{\frac{2}{d}} = 1 \qquad \text{Equation I}$$

Layout unit 26 applies a super-eclipse function to the pixel values of each image 14 in an overlap area and a border area to produce seamless in-slide transitions between each image 14 on the slide 32. The in-slide transitions create a blended appearance of images 14(1)-14(4) on slide 32 that enhances the content similarities identified from image metadata 22. In other examples, layout unit 26 may apply other suitable mathematical functions to the pixel value of the overlap and border areas of images 14 to blend the images 14 and create the in-slide transitions. In an example where a slide 32 includes a single image 14, layout unit 26 may blur the edges of slide 32 only.

Figure 5C:
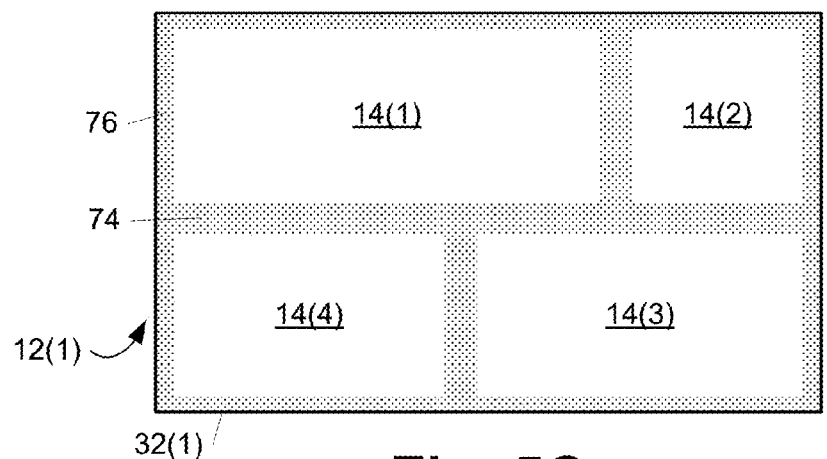

In the example shown in FIG. 5C, layout unit 26 applies the super-eclipse function to the pixel values of images 14(1)-14(4) in the overlap areas 74 between images 14(1)-14(4) of slide 32(1) as indicated by shading between images 14(1)-14(4) in FIG. 5C. Layout unit 26 also applies the super-eclipse function to the pixel values of images 14(1)-14(4) in a border area 76 of slide 32(1) as indicated by shading between images 14(1)-14(4) and the edges of slide 32(1) in FIG. 5C.

Additional details on methods for generating layouts of images 14 may be found in U.S. patent application Ser. No. 11/536,556, entitled GRAPHIC ASSEMBLY LAYOUT WITH MAXIMUM PAGE COVERAGE AND CONTENT REMOVAL, and filed Sep. 28, 2006; U.S. patent application Ser. No. 11/769,671, entitled ARRANGING GRAPHIC OBJECTS ON A PAGE WITH RELATIVE AREA BASED CONTROL, and filed Jun. 27, 2007; and U.S. patent application Ser. No. 11/865,112, entitled ARRANGING GRAPHIC OBJECTS ON A PAGE WITH RELATIVE POSITION BASED CONTROL, and filed Oct. 1, 2007 which are incorporated by reference herein.

Referring back to FIG. 2, in an example, transition unit 28 generates between-slide transitions as indicated in a block 46. The between-slide transitions form transition effects that produce visually appealing and semantically meaningful transition animations between slides 32 in slideshow 30. Transition unit 28 uses image metadata 22 to create between-slide transitions that emphasize relationships between images 14 on sequential slides 32 in slideshow 30. These relationships distinguish the between-slide transitions from predefined or random animation sequences that do not determine image similarities between images 14 on sequential slides 32. Transition unit 28 generates the between-slide transitions using the method described in FIG. 6 in one example.

Figure 7:
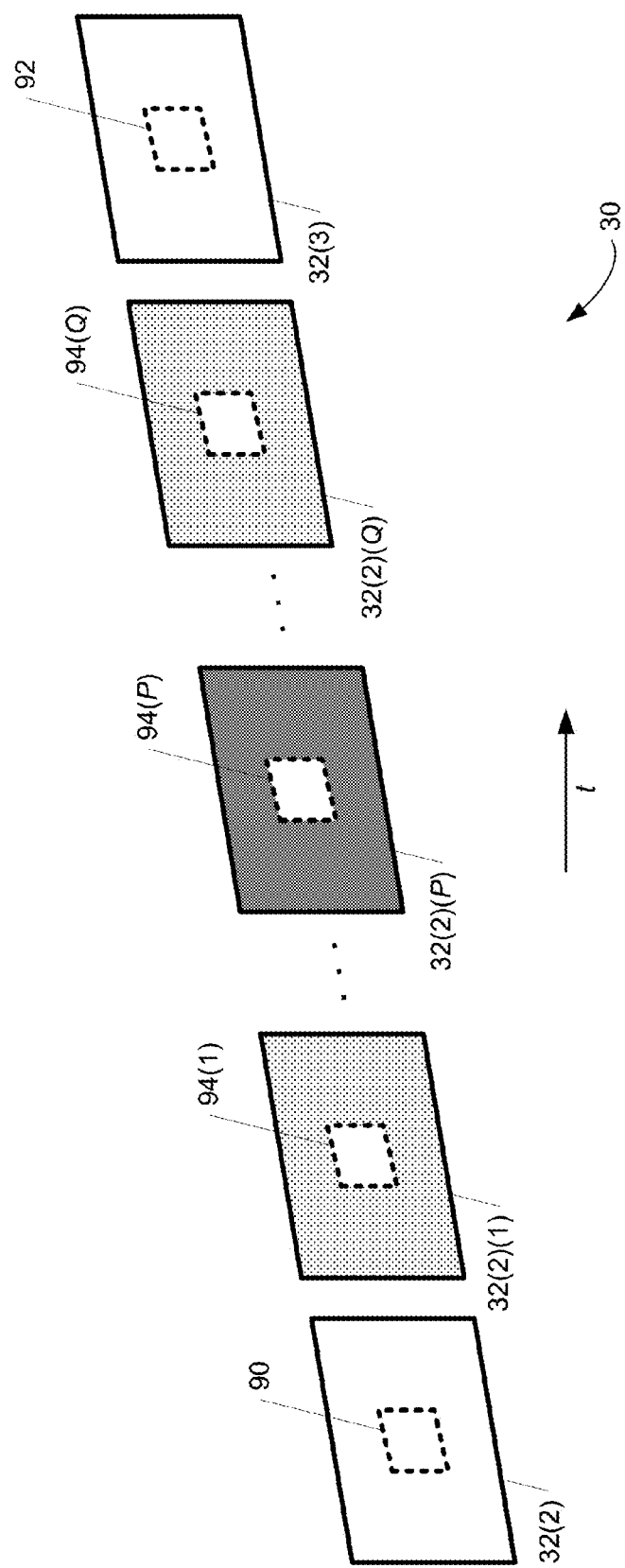
FIG. 7 is a block diagram illustrating one embodiment of a between-slide transition.

Transition unit 28 selects a region of interest in each slide 32 using image metadata 22 as indicated in a block 82. Transition unit 28 identifies corresponding regions of interest in two slides 32 generated by layout unit 26. Each slide 32 may include one or more images 14 and the region of interest may be located in any suitable image 14 in each slide 32. In FIG. 7, for example, a region of interest 90 may be selected in a slide 32(2), and a region of interest 92 may be selected in a slide 32(3).

The regions of interest may encompass any generally corresponding size and shape of areas of two sequential slides 32 with content similarities identified using image metadata 22. For example, the regions of interest may include one or more similar faces, objects, recognizable patterns, colors, and/or textures. The regions of interest may appear in the foreground or background of images 14 in slides 32.

Figure 6:
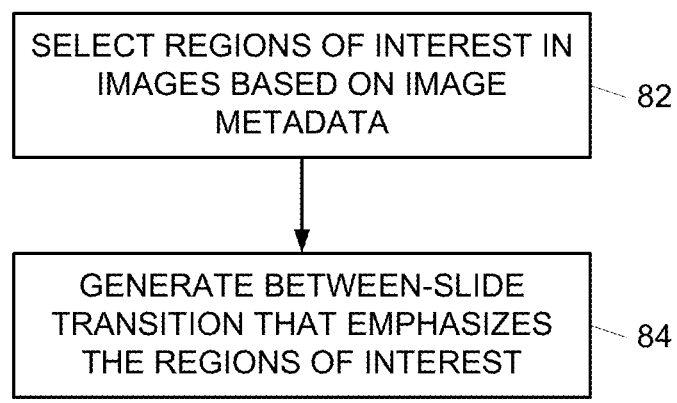
FIG. 6 is a flow diagram illustrating one embodiment of a method for generating a between-slide transition.

Referring to FIG. 6, transition unit 28 generates a between-slide transition that emphasizes the regions of interest in the slides 32 as indicated in a block 84. Transition unit 28 generates the between-slide transition such that the style and strength of the transition effect between pixels of two slides 32 depends on the distance of the pixels to the regions of interest. Transition unit 28 also generates the between-slide transition such that the amount of blending of the slides 32 in the between-slide transition varies with time.

As shown in the example of FIG. 7, transition unit 28 generates a between-slide transition from slide 32(2) to slide 32(3) using the regions of interest 90 and 92. To do so, transition unit 28 creates an animation that forms intermediate slides 32(2)(1)-32(2)(Q) and blends slides 32(2) and 32(3), where Q is an integer that is greater than or equal to one. As time t progresses from the display of slide 32(2), the level of distortion increases as the content of slides 32(2) and 32(3) is increasingly blended together as indicated by the shading in slides 32(2)(1)-32(2)(Q). A maximum amount of distortion occurs in slide 32(2)(P) where P is an integer greater than or equal to one and less than or equal to Q. The level of distortion then begins to decrease until slide 32(3) is displayed without distortion.

Transition unit 28 generates the regions of interest 94(1)-94(Q) with a lesser amount of distortion than the amount of distortion in the remainder of corresponding slides 32(2)(1)-32(2)(Q). In doing so, the focal point of the transition becomes the regions of interest 90, 92, and 94(1)-94(Q) where these regions have content similarities that were determined by transition unit 28 as described above. As a result, the between-slide transition provides a meaningful transition between slides 32(2) and 32(3).

Additional details of generating a between-slide transition will now be described. Given the texture coordinate of a pixel in a slide 32 is (x, y) (0<=x, y<=1), the amount of distortion at time t may depend on the distance d between this pixel and the region of interest, and may be expressed as Equation II, where f is a vector function.

$$\text{Distortion}(x, y) = \begin{bmatrix} \Delta_x \\ \Delta_y \end{bmatrix} = f(t, d) \quad \text{Equation II}$$

In two dimensional space, the distortion is a 2×1 vector. In Equation II, the distance d may be computed in any suitable way, such as Euclidean distance and color distance between this pixel and the region of interest. For example, if the region of interest is in the shape of a circle and the center of the circle is $(x_c, y_c)$, the function may be expressed as Equation III.

$$\text{Distortion}(x, y) = t \times f\left(\left\|\begin{bmatrix} x - x_c \\ y - y_c \end{bmatrix}\right\|\right) \quad \text{Equation III}$$

Here, the vector $$f\left(\left\|\begin{bmatrix} x - x_c \\ y - y_c \end{bmatrix}\right\|\right)$$

is the distortion speed for that pixel (x, y) and the distance d is the Euclidean distance between this pixel and the region of interest center.

In one example, transition unit 28 applies the function of Equation III to slides 32(2) and 32(3) and blends slides 32(2) and 32(3) linearly based on transition time to create a water-drop effect, where $r_0$ is the radius of the regions of interest 90 and 92 in slides 32(2) and 32(3), respectively.

$$\text{if}(d < r_0) \text{ then } |f| = \sin(k\pi d) \times \left(\frac{d}{r_0}\right)^{10}, \quad \text{Equation III}$$

$$\text{else } |f| = \sin(k\pi d)$$

Using Equation III, the between-slide transition causes the display of slides 32(2) and 32(3) appear to a viewer as if a water drop hits region of interest 90 and slide 32(2) is transformed into slide 32(3).

In other examples, other suitable distortion functions may be used to create other suitable effects such as a waterflow effect, a spotlight effect, or a color flow effect. With each distortion function, the function may be chosen to keep the magnitude of the function (i.e., the amount of distortion) small in the regions of interest to emphasize the display of the regions of interest.

The above examples may enhance automatically generated slideshows by highlighting and emphasizing identified relationships in images 14 used to create the slideshow. These relationships may be incorporated into in-slide and between-slide transitions to provide a more fluid, meaningful, and dynamic slideshow. As a result, slideshows may be generated with more visually pleasing transition effects and an increased level of satisfaction with the created slideshow.

Figure 8:
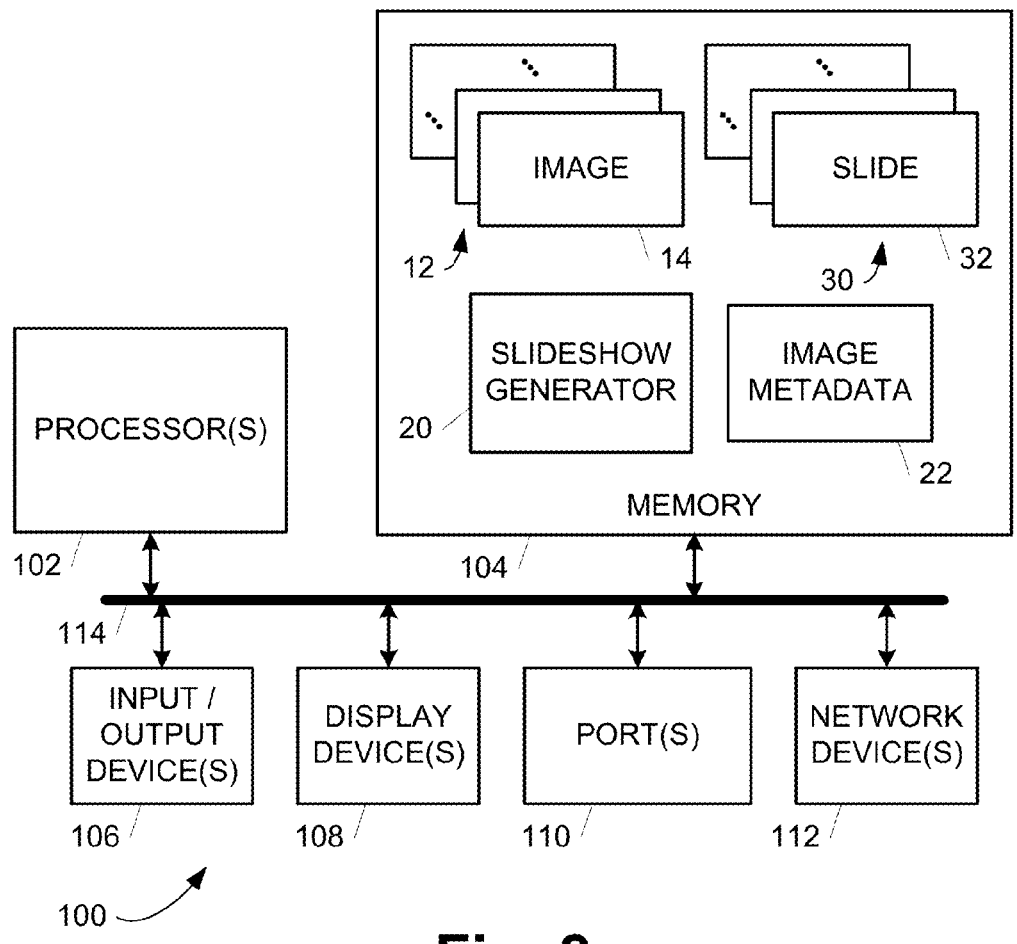
FIG. 8 is a block diagram illustrating one embodiment of an image processing system that includes a slideshow generator.

FIG. 8 is a block diagram illustrating one example of an image processing system 100 that includes slideshow generator 20. Image processing system 100 represents any suitable processing device, or portion of a processing device, configured to implement the functions of slideshow generator 20 described above. Image processing system 100 may be included in a digital still and/or video camera, a mobile telephone, a personal digital assistant (PDA) or an audio/video device (as non-limiting examples), or may represent a personal computer, a laptop computer, a tablet computer, a server or other type of computer. Components of image processing system 100 (for example, processors 102, memory system 104, input/output devices 106, display devices 108, ports 110, network devices 112, and interconnections 114) may be contained in a common housing (not shown) or in any suitable number of separate housings (not shown).

Image processing system 100 includes one or more processors 102, a memory system 104, zero or more input/output devices 106, zero or more display devices 108, zero or more ports 110, and zero or more network devices 112. Processors 102, memory system 104, input/output devices 106, display devices 108, ports 110, and network devices 112 communicate using a set of interconnections 114 that includes any suitable type, number, and/or configuration of controllers, buses, interfaces, and/or other wired or wireless connections. Image processing system 100 may execute a basic input output system (BIOS), firmware, and/or an operating system that includes instructions executable by processors 102 to manage the components of image processing system 100 and provide a set of functions that allow slideshow generator 20 to access and use the components.

Each processor 102 is configured to access and execute instructions stored in memory system 104. The instructions may include a basic input output system (BIOS) or firmware (not shown), an operating system (not shown), slideshow generator 20, and other applications (not shown). Each processor 102 may execute the instructions in conjunction with or in response to information received from input/output devices 106, display devices 108, ports 110, and/or network devices 112. Each processor 102 is also configured to access and store data, such as the set 12 of images 14, image metadata 22, and the slideshow 30 with slides 32, in memory system 104.

Memory system 104 includes any suitable type, number, and configuration of volatile or non-volatile storage devices configured to store instructions and data. The storage devices of memory system 104 represent computer readable storage media that store computer-executable instructions including, in one example, slideshow generator 20. Memory system 104 also stores the set 12 of images 14, image metadata 22, and the slideshow 30 with slides 32. Memory system 104 stores instructions and data received from processors 102, input/output devices 106, display devices 108, ports 110, and network devices 112. Memory system 104 provides stored instructions and data to processors 102, input/output devices 106, display devices 108, ports 110, and network devices 112. The instructions are executable by image processing system 100 to perform the functions and methods of slideshow generator 20 described herein. Examples of storage devices in memory system 104 include hard disk drives, random access memory (RAM), read only memory (ROM), flash memory drives and cards, and magnetic and optical disks.

Input/output devices 106 include any suitable type, number, and configuration of input/output devices configured to input instructions and/or data from a user to image processing system 100 and output instructions and/or data from image processing system 100 to the user. Examples of input/output devices 106 include buttons, dials, knobs, switches, a keyboard, a mouse, a touchpad, and a touchscreen.

Display devices 108 include any suitable type, number, and configuration of display devices configured to output image, textual, and/or graphical information to a user of image processing system 100. Examples of display devices 108 include a display screen, a monitor, and a projector. Display devices 108 may be configured to display all or selected images 14 from the set 12 and all or selected slides 32 from slideshow 30.

Ports 110 include suitable type, number, and configuration of ports configured to input instructions and/or data from another device (not shown) to image processing system 100 and output instructions and/or data from image processing system 100 to another device.

Network devices 112 include any suitable type, number, and/or configuration of network devices configured to allow image processing system 100 to communicate across one or more wired or wireless networks (not shown). Network devices 112 may operate according to any suitable networking protocol and/or configuration to allow information to be transmitted by image processing system 100 to a network or received by image processing system 110 from a network.

Figure 9:
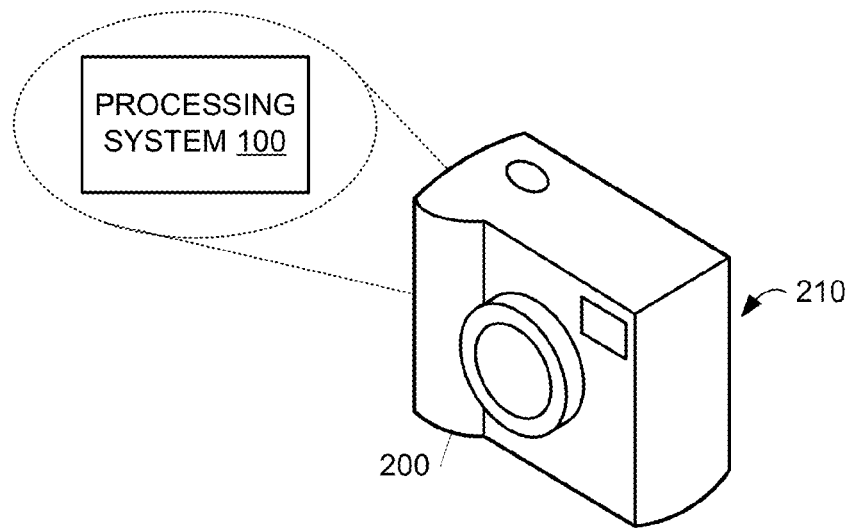
FIG. 9 is a block diagram illustrating one embodiment of an image capture device that includes an image processing system with a slideshow generator.

In one example, image processing system 100 is included in an image capture device 200 that captures, stores, and processes frames 12 as shown in the example of FIG. 9. Image capture device 200 may generate slideshow 30 using slideshow generator 20 and display slideshow 30 to a user using an integrated display device 210. In other examples, image processing system 100 receives the set 12 of images 14 from another image capture device and/or storage media and processes images 14 using slideshow generator 20 as described above.

Although specific embodiments have been illustrated and described herein for purposes of description of the embodiments, it will be appreciated by those of ordinary skill in the art that a wide variety of alternate and/or equivalent implementations may be substituted for the specific embodiments shown and described without departing from the scope of the present disclosure. Those with skill in the art will readily appreciate that the present disclosure may be implemented in a very wide variety of embodiments. This application is intended to cover any adaptations or variations of the disclosed embodiments discussed herein. Therefore, it is manifestly intended that the scope of the present disclosure be limited by the claims and the equivalents thereof.

What is claimed is:

1. A method performed by a processing system, the method comprising:

generating a between-slide transition between a first slide including a first region of interest in a first digital image and a second slide including a second region of interest in a second digital image, the first and the second regions of interest including similar content, and the between-slide transition including at least one intermediate slide formed from one of the first and the second digital images with a corresponding one of the first and the second regions of interest, which includes the similar content, being a focal point and a transition effect being applied to a remainder of the one of the first and the second digital images;

generating the between-slide transition with an amount of distortion of the transition effect, as applied to the remainder of the one of the first and the second digital images, varying with time during display of the first slide, the at least one intermediate slide, and the second slide as part of a slideshow; and generating the between-slide transition such that a strength of the transition effect between pixels in the first and the second digital images depends on the distance of the pixels to the first and the second regions of interest, wherein the at least one intermediate slide includes at least a first intermediate slide formed from the first digital image and a second intermediate slide formed from the second digital image, wherein the transition effect, as applied to the remainder of the one of the first and the second digital images, is first applied in an increasing manner to the first intermediate slide and thereafter applied in a decreasing manner to the second intermediate slide.

2. The method of claim 1 further comprising:
selecting the first and the second digital images from the set of digital images with the processing system based on the image content analysis.

3. The method of claim 1 further comprising:
generating the between-slide transition such that a first amount of distortion in the first and the second regions of interest is less than a second amount of distortion in the remainder of the first and the second slides.

4. The method of claim 1 further comprising:
generating the between-slide transition such that the amount of distortion of the transition effect, as applied to the remainder of the one of the first and the second digital images, increases and then decreases between the first and the second slides.

5. The method of claim 1 further comprising:
displaying the first slide, the at least one intermediate slide, and the second slide as part of the slideshow.

6. The method of claim 1 wherein the set of digital images are captured with an image capture device.

7. The method of claim 1 further comprising:
generating the between-slide transition to emphasize a relationship between the first region of interest in the first digital image and the second region of interest in the second digital image determined from the image content analysis.

8. A non-transitory computer readable storage medium storing computer-executable instructions that, when executed by an image processing system, perform a method comprising:
selecting a first region of interest in a first digital image in a first slide of a slideshow and a second region of interest in a second digital image in a second slide of the slideshow based on image content analysis of a set of digital images that include the first and the second digital images, the first and the second regions of interest including similar content;
generating a between-slide transition between the first and the second slides, the between-slide transition including at least one intermediate slide formed from one of the first and the second digital images with a corresponding one of the first and the second regions of interest, which includes the similar content, being emphasized and a transition effect being applied to a remainder of the one of the first and the second digital images;
generating the between-slide transition such that an amount of distortion of the transition effect, as applied to the remainder of the one of the first and the second digital images, varies with time during display of the first slide, the at least one intermediate slide, and the second slide as part of the slideshow; and
generating the between-slide transition such that a strength of the transition effect between pixels in the one of the first and the second digital images depends on a distance of the pixels to the corresponding one of the first and the second regions of interest, wherein the at least one intermediate slide includes at least a first intermediate slide formed from the first digital image and a second intermediate slide formed from the second digital image, wherein the transition effect, as applied to the remainder of the one of the first and the second digital images, is first applied to the first intermediate slide in an increasing manner and then applied to the second intermediate slide in a decreasing manner.

9. The non-transitory computer readable storage medium of claim 8, the method further comprising:
generating the between-slide transition such that the amount of distortion of the transition effect, as applied to the remainder of the one of the first and the second digital images, increases and then decreases between the first and the second slides.

10. The non-transitory computer readable storage medium of claim 8, the method further comprising:
generating the between-slide transition such that a first amount of distortion in the first and the second regions of interest is greater than a second amount of distortion outside of the first and the second regions of interest in the first and the second slides.

11. The non-transitory computer readable storage medium of claim 8, the method further comprising:
generating the between-slide transition such that a first amount of distortion in the first and the second regions of interest is less than a second amount of distortion in the remainder of the first and the second slides.

12. The non-transitory computer readable storage medium of claim 8, the method further comprising:
displaying the first slide, the at least one intermediate slide, and the second slide as part of the slideshow.

13. A system comprising:
a memory including a slideshow generator, a set of digital images, and image metadata generated from image content analysis of the set of digital images; and
a processor configured to execute the slideshow generator to:
generate a between-slide transition between a first slide including a first region of interest in a first digital image and a second slide including a second region of interest in a second digital image, the first and the second regions of interest including similar content, and the between-slide transition including at least one intermediate slide formed from one of the first and the second digital images with a corresponding one of the first and the second regions of interest, which includes the similar content, being a focal point and a transition effect being applied to a remainder of the one of the first and the second digital images;
generate the between-slide transition such that an amount of distortion of the transition effect, as applied to the remainder of the one of the first and the second digital images, varies with time during display of the first slide, the at least one intermediate slide, and the second slide as part of a slideshow; and
generate the between-slide transition such that a strength of the transition effect between pixels in the one of the first and the second digital images depends on a distance of the pixels to the corresponding one of the first and the second regions of interest,
wherein the at least one intermediate slide includes at least a first intermediate slide formed from the first digital image and a second intermediate slide formed from the second digital image, wherein the transition effect, as applied to the remainder of the one of the first and the second digital images, is first applied in an increasing manner to the first intermediate slide and lastly applied in a decreasing manner to the second intermediate slide.

14. The system of claim 13, wherein the processor is configured to execute the slideshow generator to:
generate the between-slide transition such that the amount of distortion of the transition effect, as applied to the remainder of the one of the first and the second digital images, increases and then decreases between the first and the second slides.

15. The system of claim 13, wherein the processor is configured to execute the slideshow generator to:
display the first slide, the at least one intermediate slide, and the second slide as part of the slideshow.

16. The system of claim 13, wherein the between-slide transitions emphasize a relationship between the first and the second digital images determined from the image content analysis.

17. The system of claim 13, wherein the processor is configured to execute the slideshow generator to:
generate the between-slide transition such that a first amount of distortion in the first and the second regions of interest is less than a second amount of distortion in the remainder of the first and the second slides.

* * * * *